Patented June 15, 1926.

1,588,554

UNITED STATES PATENT OFFICE.

ALBRECHT THIELE, OF BERLIN, GERMANY, ASSIGNOR TO CHEMISCHE FABRIK AUF ACTIEN (VORM. E. SCHERING), OF BERLIN, GERMANY.

MANUFACTURE OF A PHARMACEUTICAL PRODUCT.

No Drawing. Application filed May 18, 1923, Serial No. 639,976, and in Germany May 29, 1922.

The invention relates to the preparation of a new pharmaceutical product which is the reaction product of 4-dimethylamino-2.3-dimethyl-1-phenyl-5-pyrazolon and diallylbarbituric acid, and which may be formed by melting these two materials together. The product is of yellow colour, melts at about from 85° to 88° centigrade and is soluble in water, especially when warmed, and in alcohol, ether and acetone. It is marked by valuable therapeutical properties, particularly by excellent analgesic effects.

The product which must be supposed to be an addition-compound is prepared by melting together 4-dimethylamino-2.3-dimethyl-1-phenyl-5-pyrazolon with diallylbarbituric acid, in such a manner as to avoid decomposition, at a temperature not exceeding about 125° centigrade. Thus two molecules of 4-dimethylamino-2.3-dimethyl-1-phenyl-5-pyrazolon and one molecule of diallylbarbituric acid are combined, preferably by melting together the two compounds in the above stated ratio, though the compounds may be otherwise combined if desired.

To perform the method of preparation one proceeds for instance as follows:

Two molecules of 4-dimethylamino-2.3-dimethyl-1-phenyl-5-pyrazolon are heated with one molecule of diallylbarbituric acid, while the mixture, is being well stirred to a temperature of about 115° centigrade until the compounds have been melted to a yellow liquid. The melted mass is filtered off, while hot, and then is allowed to freeze.

I claim as my invention:—

1. The reaction product of the combination of diallylbarbituric acid with 4-dimethylamino-2.3-dimethyl-1-phenyl-5-pyrozolon.

2. As a new article of manufacture a product consisting of two molecules of 4-dimethylamino-2.3-dimethyl-1-phenyl-5-pyrazolon and one molecule of diallylbarbituric acid, melting at about from 85° to 88° centigrade, being soluble in water especially when warmed, in alcohol, ether and acetone, and possessing strong analgesic properties.

In testimony whereof I have hereunto set my signature.

Dr. ALBRECHT THIELE.